United States Patent
Malin

(10) Patent No.: US 9,504,358 B1
(45) Date of Patent: Nov. 29, 2016

(54) UTENSIL FOR TOASTERS AND OTHER APPLIANCES

(71) Applicant: Leo Malin, Newton, NJ (US)

(72) Inventor: Leo Malin, Newton, NJ (US)

( * ) Notice: Subject to any disclaimer, the term of this patent is extended or adjusted under 35 U.S.C. 154(b) by 0 days.

(21) Appl. No.: 14/734,146

(22) Filed: Jun. 9, 2015

Related U.S. Application Data

(60) Provisional application No. 62/099,821, filed on Jan. 5, 2015.

(51) Int. Cl.
*B25B 7/00* (2006.01)
*B25B 9/00* (2006.01)
*A47J 43/28* (2006.01)
*A47G 21/10* (2006.01)

(52) U.S. Cl.
CPC .............. *A47J 43/283* (2013.01); *A47G 21/10* (2013.01)

(58) Field of Classification Search
CPC ........... A47G 21/10; B65G 7/12; B25J 7/00; B25B 9/02; A47J 43/283
USPC ........................ 294/3, 16, 99.1–99.2; D7/393
See application file for complete search history.

(56) References Cited

U.S. PATENT DOCUMENTS

| | | |
|---|---|---|
| 3,137,880 A | 6/1964 | Kubit et al. |
| 3,934,915 A | 1/1976 | Humpa |
| 3,957,298 A | 5/1976 | Purchase |
| D284,440 S * | 7/1986 | Zieff ............................. D7/666 |
| 4,728,139 A | 3/1988 | Oretti |
| 4,802,704 A | 2/1989 | Burns |
| 5,791,053 A | 8/1998 | Koong |
| 5,901,993 A | 5/1999 | Lowery et al. |
| 5,934,721 A | 8/1999 | Walde |
| 5,979,960 A | 11/1999 | Osmar |
| 6,129,398 A | 10/2000 | Calhoun |
| 6,375,237 B1 | 4/2002 | Koenig |
| D459,954 S | 7/2002 | Wang et al. |
| 6,494,517 B1 | 12/2002 | Durant |
| D507,724 S * | 7/2005 | Bertulis ......................... D7/686 |
| D539,615 S | 4/2007 | Weaver |
| 7,216,910 B2 | 5/2007 | Frauscher |
| 7,287,791 B2 | 10/2007 | Carolina |
| D586,629 S | 2/2009 | Reynolds |
| D606,814 S | 12/2009 | Mineo |
| 7,665,786 B2 * | 2/2010 | Simons ..................... B25B 9/00 294/99.2 |
| 8,038,187 B2 | 10/2011 | Resnick |

* cited by examiner

*Primary Examiner* — Stephen Vu
(74) *Attorney, Agent, or Firm* — Thomas L. Adams

(57) ABSTRACT

A utensil can remove a food product such as toast from the slot of an appliance. The utensil has an opposing pair of longitudinally disposed tongs that are interconnected at their proximal ends. Each tong has a distal paddle that is wider than the interconnected proximal ends. Each paddle has a tapered distal edge that is sloped to increase clearance at the inside face of the paddle. Each paddle has on its inside face a number of projections, with the ones adjacent to the paddle's distal edge having a distal flank that is sloped to facilitate ingressive passage across them. The tongs can be held with a single hand and kept in a substantially parallel orientation that allows insertion into the slot around either side of the food product. The tongs can be manually pressed together to embed the projections into the food product before lifting and removing it.

33 Claims, 7 Drawing Sheets

US 9,504,358 B1

UTENSIL FOR TOASTERS AND OTHER APPLIANCES

CROSS-REFERENCES TO RELATED APPLICATIONS

This application claims the benefit of U.S. Provisional Patent Application Ser. No. 62/099,821, filed 1 Jan. 2015, the contents of which are hereby incorporated by reference herein.

BACKGROUND OF THE INVENTION

1. Field of the Invention

Embodiments of the present invention relate to kitchens and/or to household utensils, primarily a set of tongs for removal of items from devices such as toasters and the like.

2. Description of Related Art

Many tongs have been created but none have been created to aid in proper toaster safety. The Consumer Products Safety Commission estimates that on average, 15 people are electrocuted annually in the U.S. due to faulty or misused home electrical appliances, including toasters.

Generally, if a toasted item gets stuck in the toaster, the safe option to remove it is to unplug the toaster, open the crumb door on the bottom, and use something dull and nonmetallic such as a wooden spoon handle to push the toast out from the bottom. This is a time consuming way and is utilized by very few people.

A more common action is the insertion of a metal knife or fork into a toaster either when the toaster is plugged in, or perhaps unplugged. This action is not recommended, because there is a risk of electrocution if the toaster is plugged in Although there is generally no immediate risk of electrocution if the toaster is unplugged, there is the possibility of damaging the toaster and creating a future hazard. Generally, a toaster's heating coils are insulated from the metal chassis by an insulating material such as, for example, mica. Mica is a mineral known to have excellent thermal and electrically-insulating properties, thereby making it well suited to this type of use. However, mica is thin and brittle, and if a sharp knife or fork were to pierce the mica and allow the coil to contact the chassis, this could cause a short, leading to a blown fuse or an electrically hot metal frame that could shock or electrocute someone. Insertion of other objects, such as a knife, fork or screwdriver could also damage internal components, such as the wiring or heating elements, internal safety switches that affect the heating elements, etc., thereby creating potential electrical and fire hazards. Thus, there is a need for a safer and more convenient way for an individual to remove a toasted item from a toaster.

Existing tongs are not useful for extricating a slice of toast from a toaster. In some cases the tips of the tongs are rather thick or have ridges or other barriers impeding insertion into a toaster on either side of the toast. In other cases the tongs are made of metal and present an extreme hazard of shock or electrocution. In still other cases, the tongs are made of a heat malleable material that will deform when used in the hot environment of a toaster.

In the prior art example of FIG. 10, when the tips of tongs 4 are inserted on either side of the slice of toast T the tongs are at a diverging angle that prevents insertion to an adequate depth. Accordingly, tongs 4 can only grip the upper edge of the slice of toast T, and will tend to tear that slice apart since often the slice is stuck at a deep location that is inaccessible to those tongs. In the prior art example of FIG. 11, when the tips of tongs 6 are inserted on either side of the slice of toast T, the tongs are at a converging angle that prevents insertion to an adequate depth. Once again, tongs 6 can only grip the upper edge of the slice of toast T, and will tend to tear that slice apart.

See also, U.S. Pat. Nos. 3,137,880; 3,934,915; 3,957,298; 4,728,139; 4,728,139; 4,802,704; 5,791,053; 5,901,993; 5,934,721; 5,979,960, 6,129,398; 6,375,237; 6,494,517; 7,216,910; 7,287,791; and 8,038,187; as well as US Design Patents D459954; D539615; D586629, and D606814.

SUMMARY OF THE INVENTION

In accordance with the illustrative embodiments demonstrating features and advantages of the present invention, there is provided a utensil for removing a food product from the slot of an appliance. The utensil includes an opposing pair of longitudinally disposed tongs having interconnected proximal ends. Each of the tongs has a distal paddle that is wider than the interconnected proximal ends. The distal paddle has an outside face, an inside face, and a tapered distal edge that is sloped to increase clearance at the inside face. The distal paddle has on the inside face a spaced plurality of projections. Predetermined ones of the plurality of projections that are adjacent to the distal edge have a distal flank that is sloped to facilitate ingressive passage across the predetermined ones. The tongs are operable to grip the food product by being manually pressed together.

In accordance with another aspect of the invention, a method is provided for retrieving toast from a slot in a toaster with a pair of tongs that each have a plurality of projections. The method includes the step of manually holding the pair of tongs in a substantially parallel orientation at a predetermined spacing that allows insertion into the slot. Another step in the method is inserting the pair of tongs into the slot on either side of the toast with the projections facing toward the toast. Another step is manually pressing the pair of tongs together to embed the projections into the toast. The method also includes the step of lifting the pair of tongs in order to retrieve the toast.

In accordance with yet another aspect of the invention, a utensil is provided for removing toast from the slot of a toaster. The utensil includes an opposing pair of longitudinally disposed tongs having interconnected proximal ends. Each of the tongs has a distal paddle that is wider than the interconnected proximal ends. The distal paddle has an outside face, an inside face, and a tapered distal edge that is sloped to increase clearance at the inside face. The distal paddle has on the inside face a spaced plurality of projections. Predetermined ones of the plurality of projections that are adjacent to the distal edge have a distal flank that is sloped to facilitate ingressive passage across the predetermined ones. The tongs are operable to grip the toast by being manually pressed together. The plurality of projections each have a base occupying a predetermined area. The predetermined area occupied by all of the plurality of projections is less than half the unoccupied territory between them. Each base of the plurality of projections has an overall width that is less than a predetermined magnitude. The base of each of the plurality of projections has a round perimeter. Each of the plurality of projections has a single peak. Each of the plurality of projections includes a surface that is a conical section. The plurality of projections are arranged in a plurality of transverse rows that are longitudinally spaced at least 2.5 cm. The plurality of projections have a height of at most 3 mm. The paddle has a lateral pair of diverging edges. The interconnected proximal ends of the pair of tongs include a curved flexible arch integrally connected between the pair of tongs. The pair of tongs include a pair of rectangular blades integrally connected to the curved flexible arch. The paddle of each of the pair of tongs is integrally connected to a different corresponding one of the rectangular blades. The paddle has a trapezoidal outline. The paddle includes an electrically non-conductive, heat-resistant material.

By employing apparatus and methods of the foregoing type, an improved technique is achieved for removing a food product from an appliance. A disclosed embodiment has two elongated, plastic tongs that are integrally connected to a curved arch. The curved arch is flexible enough to allow the tongs to be manually pressed together. This operation can be performed with a single hand. In this embodiment, a distal portion of each of the tongs has three rows of inwardly facing conical projections that can be embedded in a slice of toast to grip it.

In one embodiment each tong has a rectangular blade connecting to a trapezoidal paddle. In another embodiment each tong has a pair of diverging edges that run in a straight line from the curved arch to the distal edge of the tong. This latter embodiment is disclosed with pyramidical projections.

The disclosed embodiments are designed to avoid obstacles that would interfere with insertion into an appliance. The distal edges of the tongs are tapered to provide clearance that allows easy insertion and avoids damage to the appliance. Also, the flanks of the projections that face the appliance are sloped to allow easy insertion. In addition, the projections are sparsely distributed to avoid unnecessary friction as the projections pass along the surface of a slice of toast or other food product.

The utensil is manufactured from material that keeps heat and electricity from transferring to the user, and allows food items to be removed without the utensil getting burned or melting. The length of the utensil allows it to be inserted into a toaster without having to navigate around the cabinets that are usually located above it.

The utensil's design allows one to safely remove the food item being toasted without damage to the toaster. This utensil can be used to remove hot bread from traditional kitchen toasters. It allows people to use a safe and convenient tool, instead of putting metallic objects such as forks or knives inside the toaster and risking serious injury or death from a fire or electric shock. The utensil is manufactured from a dishwasher safe material, and has an ergonomic design that allows the user to remove objects from toasters.

The tongs, especially the curved arch interconnecting the tongs, can flex enough to allow the tongs to be manually pressed together. This operation can be performed with a single hand.

BRIEF DESCRIPTION OF THE DRAWINGS

The above brief description as well as other objects, features and advantages of the present invention will be more fully appreciated by reference to the following detailed description of illustrative embodiments in accordance with the present invention when taken in conjunction with the accompanying drawings, wherein.

DETAILED DESCRIPTION

Figure 1:
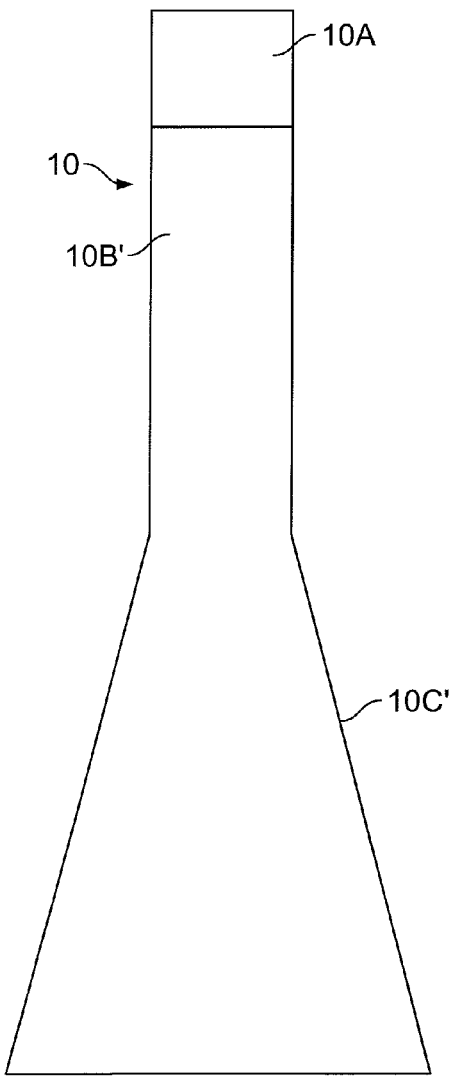
FIG. 1 is a side elevational view of a utensil in accordance with principles of the present invention.
Figure 2:
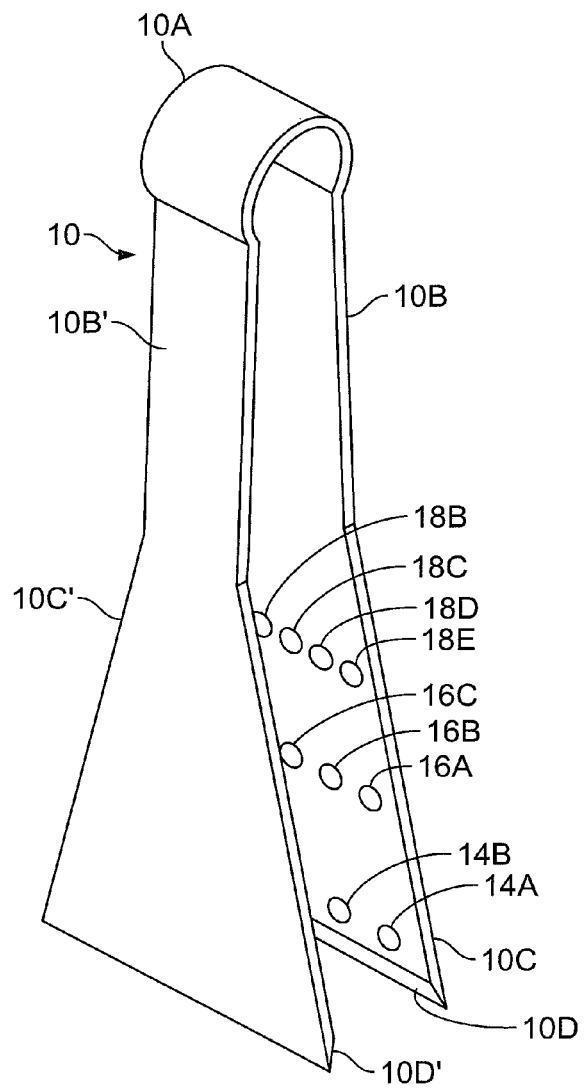
FIG. 2 is a perspective view of the utensil of FIG. 1.

With reference to the drawings, embodiments of the present invention comprise a utensil 10 (FIG. 1) that can be used for handling foodstuffs as well as other items. Breads, pastries, English muffins, bagels, strudels are some examples of the foodstuffs with which the utensil 10 can be used.

Referring to FIGS. 1-5, the illustrated utensil 10 has on one side a tong comprising adjacent sections 10B and 10C. An opposing tong is shown with adjacent sections 10B' and 10C'. The proximal ends of tong 10B/10C and tong 10B'/10C' are interconnected by a curved flexible arch 10A, which is a cylindrical segment encompassing approximately 270°. The two sections of tong 10B/10C are shown as a proximal rectangular blade 10B integrally connected to a slightly longer distal paddle 10C. The other tong 10B'/10C' likewise has a proximal rectangular blade 10B' integrally connected to a slightly longer distal paddle 10C'. Paddles 10C and 10C' both have diverging lateral edges that form a trapezoidal outline. Paddles 10C and 10C' have tapered distal edges 10D and 10D', respectively, providing additional clearance on the inside.

The flaring of paddles 10C and 10C' allows for easy gripping of a great quantity of diversely sized entities. This configuration will be effective in gripping the foodstuff to be removed, and facilitating its removal from an appliance such as a toaster. In other embodiments the paddles 10C and 100' could have a different outline, such as, for example, square, rectangular, triangular, or polygonal. In other embodiments, paddles 10C and 10C' could have an oval or elliptical shape.

In one embodiment the overall length of utensil 10 is 20 cm, with half of this length attributable to paddles 10C and 10C'. The thickness of the material of utensil 10 is in this embodiment 1-2 mm. The thickness of arch 10A can be greater than that of tongs 10B/10C and 10B'/100' to ensure that the arch does not lose its shape or break under the stress of regular usage. Also, in this embodiment, the width of blade 10B and 10B' is 2.5 cm and the length of the transverse, distal edges 10D and 10D' is 5 cm. The longitudinal length of distal edges 10D and 10D' can be 5 to 25 mm. In addition, the outside diameter of arch 10A is 3.8 cm. It will be understood that the foregoing dimensions are exemplary and that they can be varied to accommodate the size of a specific food product, or the dimensions of an appliance from which a food product is being retrieved.

In some embodiments, the utensil 10 could have a length ranging from about 5-7.5 cm to about 30-36 cm. In embodiments, the utensil 10 could have a length ranging from about 7.5 cm to about 30 cm. In embodiments, the utensil 10 could have a length ranging from about 13 cm to about 30 cm. In embodiments, the utensil 10 could have a length ranging from about 15 cm to about 25 cm. In embodiments, the utensil 10 could have a length ranging from about 15 cm to about 20 cm. Utensil embodiments having a length of about 20 cm will work well to remove toast from a standard toaster that is kept under a cabinet. The tongs are of a sufficient length to reach into the toaster and grip the food item, and yet are small enough to enable the user to comfortably use them and operate underneath a kitchen cabinet on counter on which the toaster is placed.

The thickness of tong 10B/10C and tong 10B'/10C', which are sufficiently thick (ranging from approximately about 1 mm to about 10 mm thick) that the tongs can be used for a variety of foodstuffs and other objects. In other embodiments, the tongs 10B/10C and 10B'/10C' could range in thickness from about 1 mm to about 5 mm. In other embodiments, the tongs 10B/10C and 10B'/10C' could range in thickness from about 1 mm to about 2.5 mm. In other embodiments, the tongs 10 range in thickness from about 1.5 to about 2 mm. The thickness will be chosen to keep the tongs from deforming under the stress of the objects it will be used to extract. It is to be understood that the thickness of the tongs 10B/10C and 10B'/10C' can vary from those described above, depending upon the material used in manufacturing.

The inside face of paddle 100 has three transverse rows of projections namely, (1) projections 14A, 14B, 14C, 14D, and 14E (collectively, distal row 14); (2) projections 16A, 16B, 16C, 16D, and 16E (collectively, medial row 16); and (3) projections 18A, 18B, 18C, 18D, and 18E (collectively, proximal row 18). The inside face of paddle 10C' has three transverse rows of projections, namely, (1) projections 14A', 14B', 14C', 14D', and 14E' (collectively, distal row 14'); (2) projections 16A', 16B', 16C', 16D', and 16E' (collectively, medial row 16'); and (3) projections 18A', 18B', 18C', 18D', and 18E' (collectively, proximal row 18'). The outside faces of paddles 10C and 10C' have no projections.

The projections of rows 14, 16, 18, 14', 16', and 18' aid in gripping an object with the tongs 10B/10C and 10B'/10C'. The projections of rows 14, 16, 18, 14', 16', and 18' are of sufficient height to retain and immobilize the object within the tongs 10B/10C and 10B'/10C', and do so with causing minimal or no damage to that object.

The projections of rows 14, 16, 18, 14', 16', and 18' are each in the shape of a cone with a blunt or rounded vertex, and a base with a round perimeter, so that the projections can be considered a conical section rising to a single peak. The area occupied by one the projections of rows 14, 16, 18, 14', 16', and 18' is referred to as its predetermined area. Good results are achieved if the projection height is at most 3 mm. In this embodiment each of the projections is 2 mm high and the diameter of its base is 3 mm (this diameter is also referred to as the overall width), although different dimensions may be employed in other embodiments.

The overall width (diameter of the base) of each of the projections in rows 14, 16, 18, 14', 16', and 18' will be kept at a modest magnitude, less than a predetermined magnitude D (e.g., less than 8 mm in many embodiments). In many embodiments the longitudinal spacing between rows 16 and 18, and between rows 16 and 14 (as well as between rows 16' and 18', and 16' and 14'), will be greater than twice this predetermined magnitude D. The longitudinal spacing (in the longitudinal direction) is measured along the length of tong 10B/10C (i.e., the vertical direction in FIG. 4). Also, in many embodiments, any pair of these projections in rows 14, 16, and 18 that are longitudinally spaced, are spaced at least 2.5 cm (likewise for rows 14', 16', and 18').

In some embodiments, the projections of rows 14, 16, 18, 14', 16', and 18' could range in height from about 0.2 mm to about 5 mm. In other embodiments, the projections of rows 14, 16, 18, 14', 16', and 18' could range in height from about 0.5 to about 2.5 mm. In other embodiments, the projections of rows 14, 16, 18, 14', 16', and 18' could range in height from about 1 to about 2 mm. In still other embodiments, the projections of rows 14, 16, 18, 14', 16', and 18' range in height from about 1 to about 1.5 mm.

The territory between these projections consists of all points that lie along a line that extends from anywhere on the base of one projection to anywhere on the base of another projection. The area of this "between" territory of paddle 100 (10C') that is not occupied by a projection (unoccupied territory between the projections) is greater than the area occupied by all the projections in rows 14, 16, and 18 together (14', 16', and 18' together). Having a significant unoccupied territory between projections reduces friction, as will be described presently. In fact, good results are achieved when the area occupied by all the projections of rows 14, 16, and 18 together (14', 16', and 18' together), is less than half the unoccupied territory between those projections.

Friction is also reduced by the tapered shape of the projections of rows 14, 16, 18, 14', 16', and 18'. Since the disclosed projections have a primarily conical shape, they present an inclined slope from all directions of approach. It is especially beneficial to provide a sloped surface on the distal flank of the projection (i.e., on portions of the projection facing toward edge 10D in the case of rows 14, 16, and 18, or edge 10D' in the case of rows 14', 16', and 18'). This sloped surface on the distal flank is especially beneficial for projections in rows 14 and 14' that are adjacent to edge 10D and 10D', respectively.

It will be useful if utensil 10 is formed of material that is electrically nonconductive and relatively heat resistant. In some embodiments the material of utensil 10 will be made of nylon or a thermoplastic material.

Figure 8:
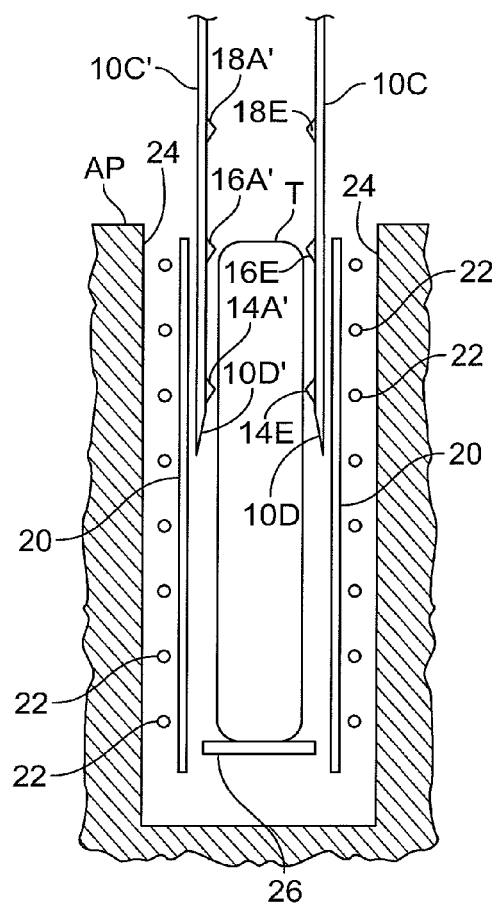
FIG. 8 is an edge view of a lower portion of the utensil of FIG. 1 being used in a method to extract a food product from the slot of an appliance, the appliance being shown in cross-section.
Figure 9:
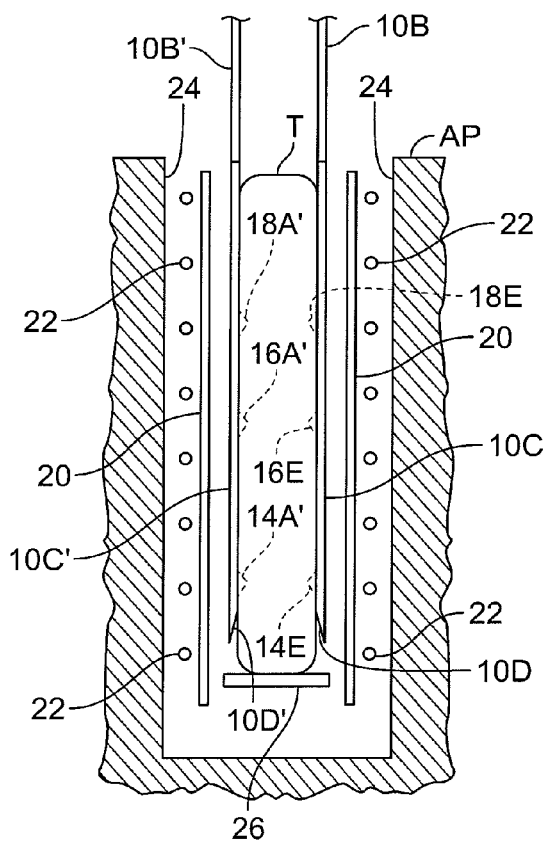
FIG. 9 is an edge view of the arrangement of FIG. 8 with the utensil more fully inserted into the appliance and gripping the food product.
Figure 10:
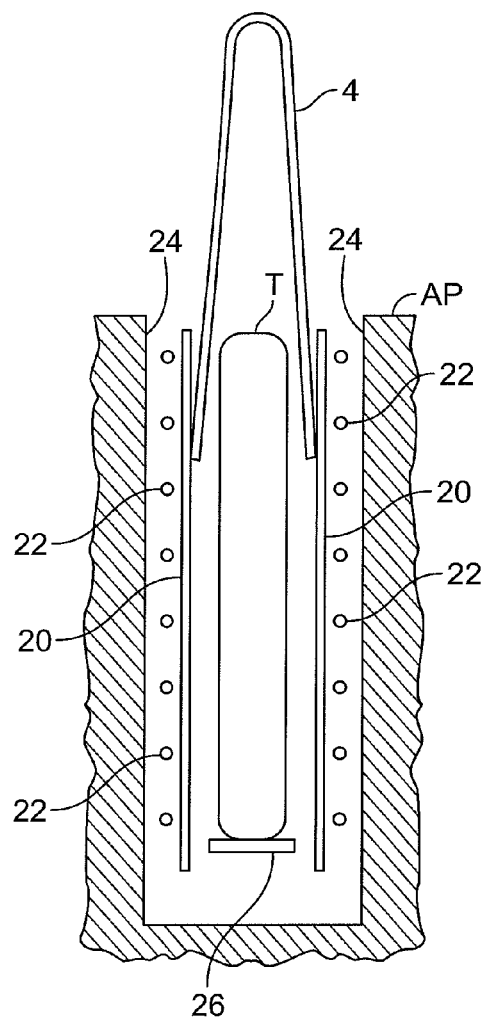
FIG. 10 is an edge view of tongs in accordance with the prior art, being used unsuccessfully to extract a food product from the slot of an appliance.
Figure 11:
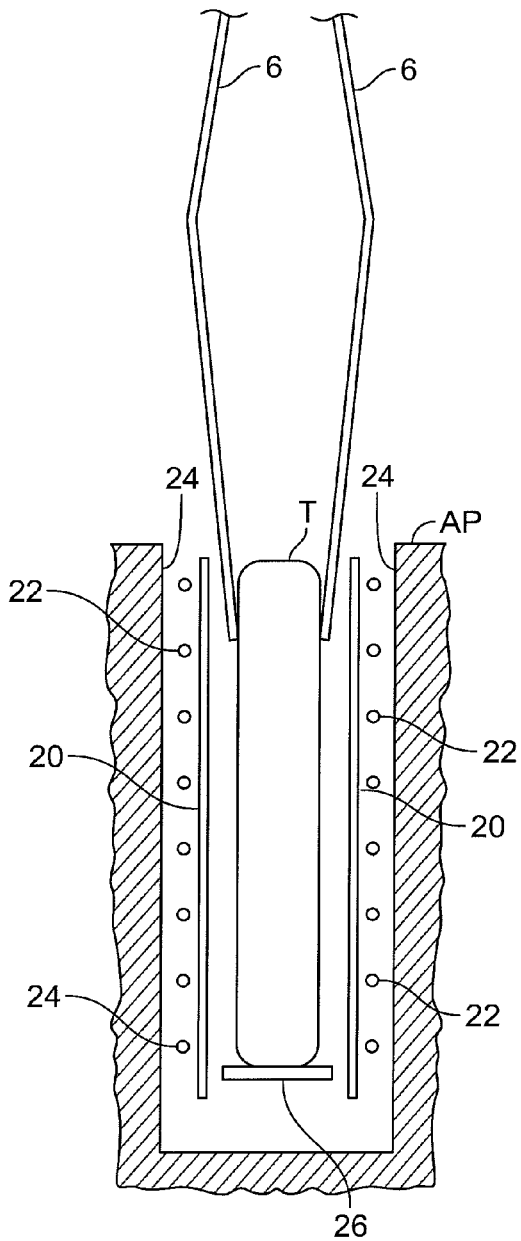
FIG. 11 is an edge view of another type of tongs in accordance with the prior art, being used unsuccessfully to extract a food product from the slot of an appliance.

To facilitate an understanding of the principles associated with the foregoing apparatus of FIGS. 1-5, its operation will be briefly described in connection with FIGS. 8 and 9. FIGS. 8 and 9 schematically illustrate a conventional toaster appliance AP, shown containing a food product, namely, a slice of toast T. The inside walls 24 of the slot of appliance AP may be lined with a refractory material such as mica. A number of electrical heating wires 22 are mounted near the inside walls 24, specifically, between inside walls 24 and guide rods 20.

Food product T is shown resting on lift platform 26. Under ideal circumstances platform 26 can lift food product T sufficiently to allow a user to grasp and remove it. While food product T is shown parallel to and spaced from guide rods 20, in some cases the food product will be thicker or will be cocked to such an extent that it will become jammed. Often food product T will be caught on rods 20.

Figure 3:
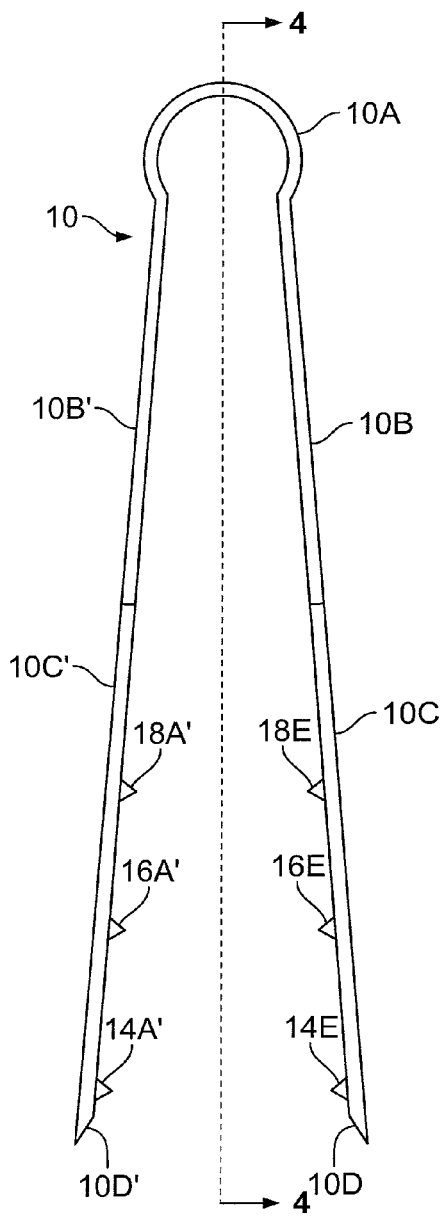
FIG. 3 is an edge view of the utensil of FIG. 1.
Figure 4:
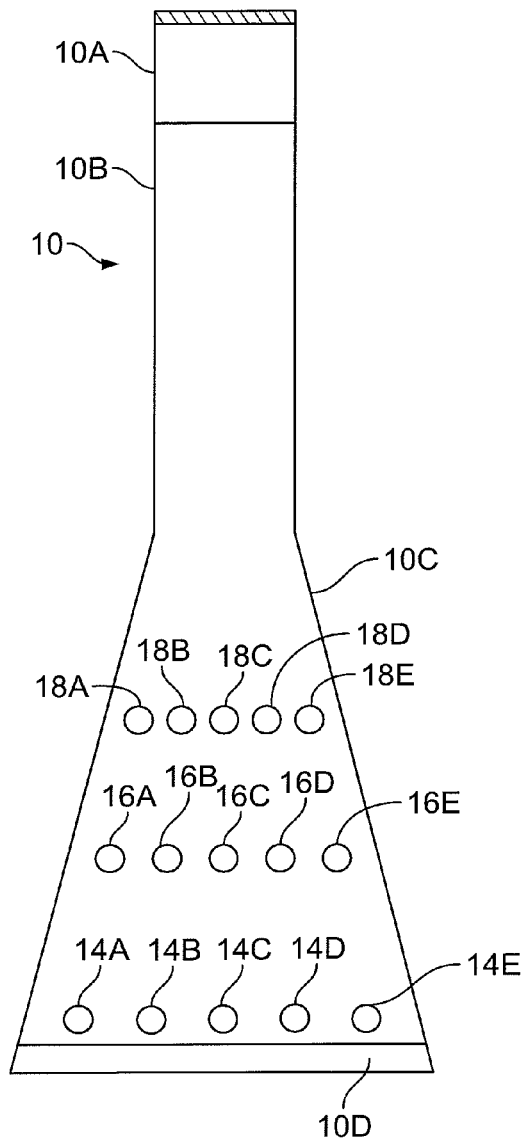
FIG. 4 is a sectional view taken along line 4-4 of FIG. 3.
Figure 5:
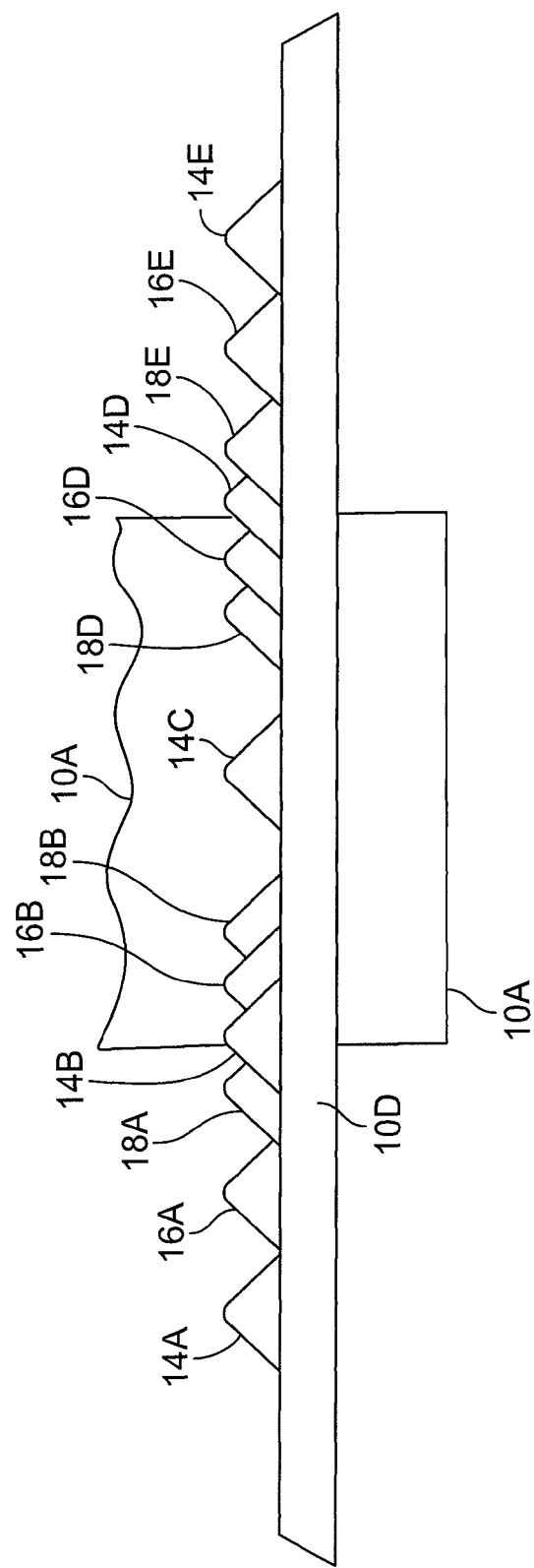
FIG. 5 is a bottom view of a portion of the utensil of FIG. 4.

FIG. 3 shows the tongs 10B/10C and 10B'/10C' in their ordinary neutral position before the application of any external pressure. Tongs 10B/10C and 10B'/10C' are essentially two flat panels diverging at about 7°, although other angles of divergence may be used instead. When needed, the user will grasp the utensil 10 at sections 10B and 10B' with a single hand, typically with a thumb opposing the forefinger and middle finger. By squeezing slightly, tongs 10B/10C and 10B'/10C' can be brought together to the approximately parallel configuration shown in FIG. 8. This predetermined spacing between parallel tongs 10B/10C and 10B'/10C' may be between 1.5 to 4 cm, although good results can be achieved with a spacing of 2 to 3 cm. This deflection of tongs 10B/10C and 10B'/10C' is provided primarily through bending of arch 10A, although some bending along the tongs can be expected as well.

It will be noticed that the tapering of edges 10D and 10D' provides additional clearance so that the paddles 10C and 10C' can slide between food product T and wire guides 20. In fact, the wedge shape of edges 10D and 10D' allows them to slice between rods 20 and food product T. Also, the distal flanks of the projections (only projections 14A', 16A', 18A', 14E, 16E, and 18E visible in FIG. 8) are tapered to provide a slope that allows them to slide over food product T and thereby reduce the insertion resistance. Furthermore, the projections of rows 14, 16, 18, 14', 16', and 18' are sparsely distributed to reduce friction and insertion resistance.

In FIG. 9 tongs 10B/10C and 10B'/10C' have been deeply inserted, almost to the lift platform 26. At this time the user will squeeze together tong sections 10B and 10B', thereby embedding the projections of rows 14, 16, 18, 14', 16', and 18' into food product T. Consequently, food product T will be firmly gripped nearly from top to bottom. Also, because sections 10C and 10C' reach from the top to almost the bottom of food product T, it can be lifted without tearing. In addition, because the material of tong sections 10C and 10C' are heat resistant and electrically nonconductive, the tongs will not deform and will not present a risk of shock or electrocution. Also, because the distal edges 10D and 10D' are relatively wide, there is little chance of intrusion between guide rods 20 and damage to heating wires 22 or the mica at surfaces 24.

After extrication, tongs 10B/10C and 10B'/10C' can be released so the retrieved food product T can be taken and prepared for consumption.

Figure 6:
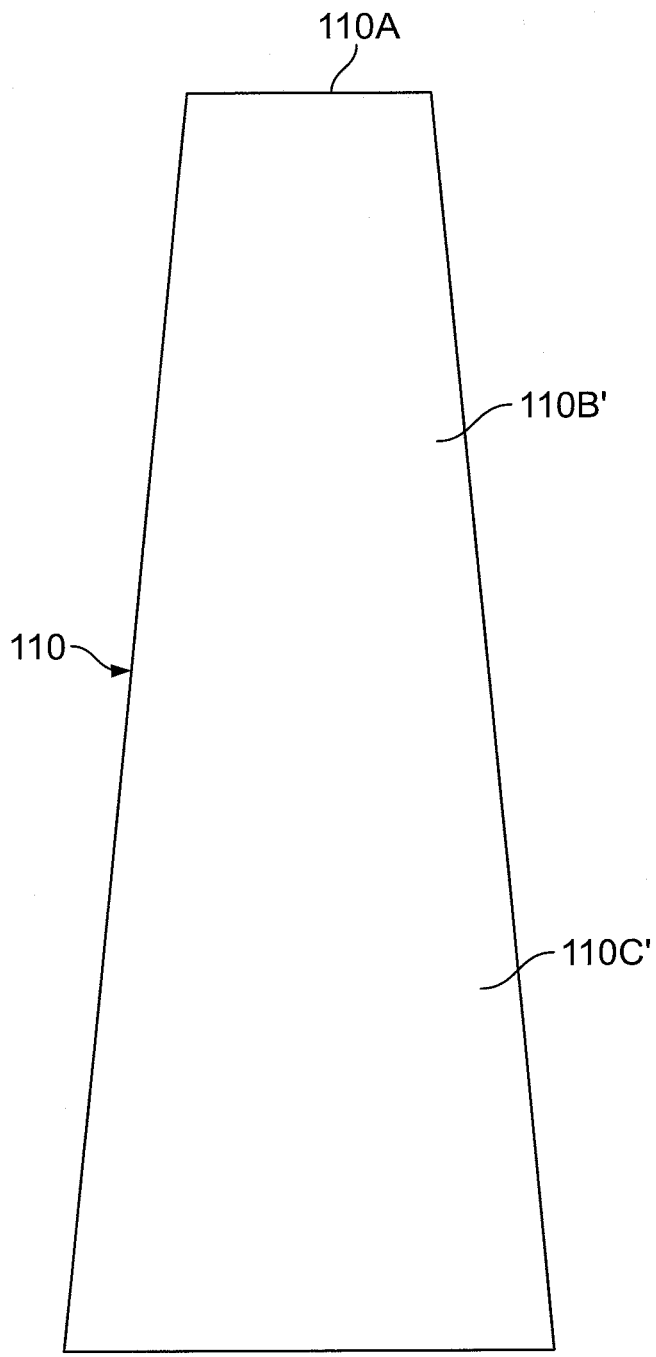
FIG. 6 is a side elevational view of a utensil that is an alternate to that of FIG. 1.
Figure 7:
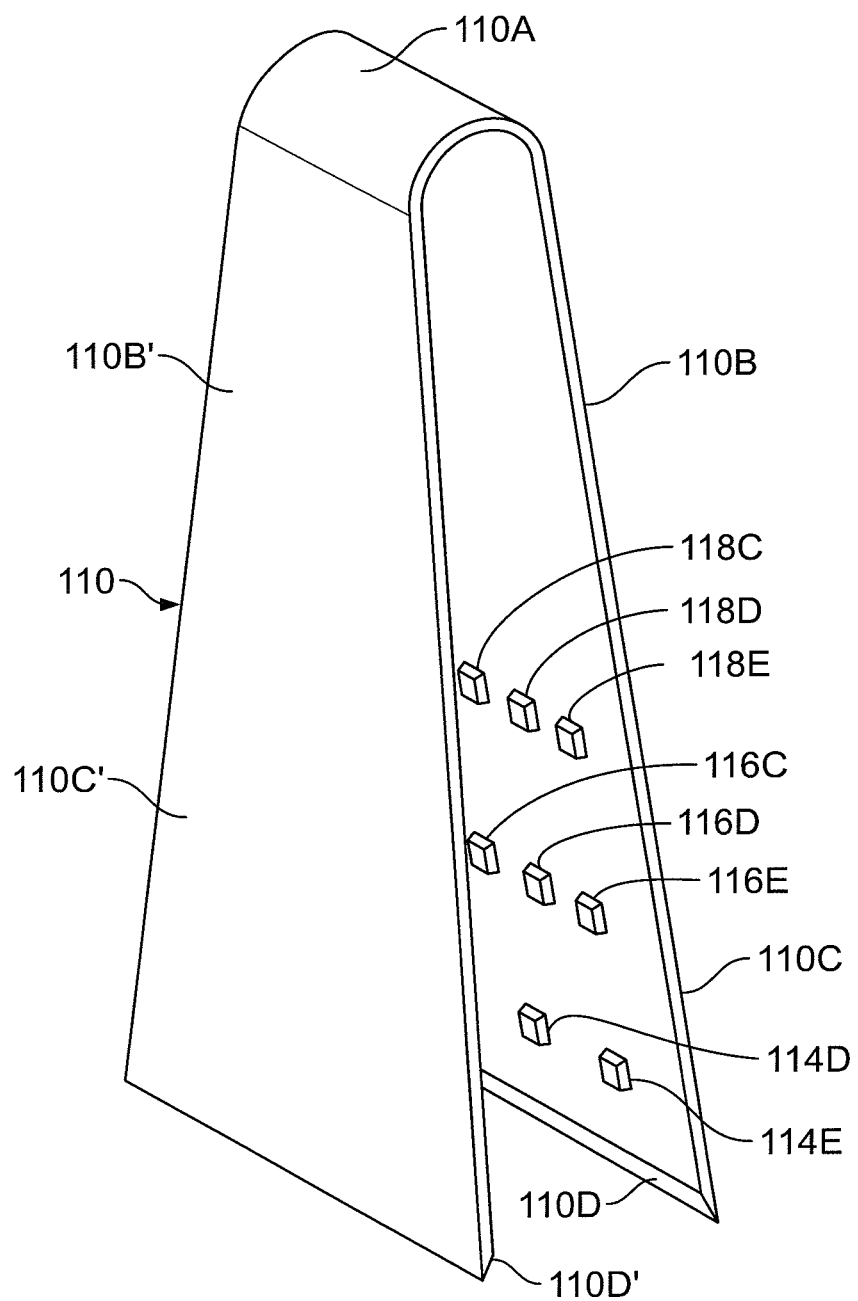
FIG. 7 is a perspective view of the utensil of FIG. 6.

Referring to FIGS. 6 and 7, an alternate utensil 110 has tong 110B/110C and tong 110B'/110C' connected at their proximal ends by a curved flexible arch 110A that encompasses approximately 180° (less the angle of divergence). Components of this embodiment that correspond to the earlier described embodiment, bear the same reference numbers but increased by 100. Utensil 110 is an integral unit formed of heat resistant and electrically nonconductive material, as before.

In this embodiment the two lateral edges of tong 110B/110C are straight and diverge at an angle of approximately 12°, although different angles of divergence are contemplated for other embodiments. The two lateral edges of tong 110B'/110C' are also straight and will diverge at the same angle. The distal edges 110D and 110D' are again tapered and provide clearance on the inside of tong sections 110C and 110C' (the latter sections also referred to as paddles).

Paddles 110C and 110C' have on their inside faces, three transverse rows of projections, at five projections per row (15 per paddle). They will be arranged in the same pattern and approximately the same spatial density as previously disclosed for utensil 10 of FIGS. 1-5, although other patterns and spatial densities are contemplated for different embodiments. In FIG. 7 some of these projections are visible on paddle 110C, namely: (1) projections 118C, 118D, and 118E, in proximal row 118; (2) projections 116C, 116D, and 116E, in medial row 116; and (3) projections 114D and 114E, in distal row 114. Paddle 110C' will have complementary rows of projections (referred to herein as rows 114', 116', and 118').

In this embodiment the projections of rows 114, 116, 118', 114', 116', and 118' are shaped as truncated pyramids, specifically, pyramids whose tops are cut off by a plane parallel to a square base. In this sense, the projections of rows 114, 116, 118', 114', 116', and 118' are considered pyramidical sections, each with a square top and four trapezoidal sides. The overall width of a projection is considered to be the largest transverse dimension projected downwardly, which in this case would be the length of the diagonal between opposite corners of the square base.

Distal edge 110D (110D') is parallel to two of the sides of the square base of each of the pyramids of rows 114, 116, and 118 (114', 116', and 118'). The distal flank of a projection is the one trapezoidal face of a projection of rows 114, 116, 118 (114', 116', and 118') that is facing toward distal edge 10D (10D').

Utensil 110 can be used in the same manner as describe before for utensil 10 of FIGS. 1-5.

It is appreciated that various modifications may be implemented with respect to the above described embodiments. Embodiments of the utensil can be manufactured from either a single piece of stamped of molded material, which is then bent into the final shape, such as seen in the Figures. Alternatively the utensil can be molded in the illustrated configurations without the need for any bending. In an alternative construction, the utensil can be manufactured from individual parts, which are then joined by conventional means of fastening, such as by heat, welding, attachment using an adhesive, or other means of joining materials, such as with fasteners. The tongs, paddles, curved arch, and projections could all be made of identical, similar or dissimilar materials.

While parallel transverse rows of projections were disclosed, some embodiments may have projections arranged in slanted, non-parallel rows. Other possible patterns include staggered projections or projections arranged in concentric rings. Also, the projections need not have a uniform height, width, or shape. Also, the pattern of projections on one tong need not be similar to that on the opposing tong. Some embodiments will have projections in the form of ridges, such as triangular prisms, curved protrusions, etc. While flat tongs were illustrated, some embodiments may have tongs with a central bend or crook, or with sections that are concave or convex. Also, the tongs need not have a uniform thickness, and the tong's thickness may vary along its length. The distal edge of a tong can be sloped relative to the tong's outside face or can have a hatchet-like edge with double slopes that are both skewed relative to the inside and outside face of the tong. Also the distal edge of a tong can be serrated, convex, or concave. In some cases the curved arch interconnecting the tongs can be replaced with a spring biased hinge. All of the dimensions of the utensil can be varied to accommodate the intended food product and appliance.

Obviously, many modifications and variations of the present invention are possible in light of the above teachings. It is therefore to be understood that within the scope of the appended claims, the invention may be practiced otherwise than as specifically described.

The invention claimed is:

1. A utensil for removing a food product from the slot of an appliance, the utensil comprising:
   an opposing pair of longitudinally disposed tongs having interconnected proximal ends, each of said tongs having a distal paddle that is wider than said interconnected proximal ends, said distal paddle having an outside face, an inside face, and a tapered distal edge that is sloped to increase clearance at said inside face, said distal paddle having on said inside face a spaced plurality of projections, the inside face of the distal paddle having unoccupied territory, the unoccupied territory being portions of the inside face of the distal paddle unoccupied by, and located between, any of the plurality of projections, predetermined ones of said plurality of projections that are adjacent to said distal edge having a distal flank that is sloped to facilitate ingressive passage across said predetermined ones, said tongs being operable to grip said food product by being manually pressed together, said plurality of projections each have a base with an overall width that is less than a predetermined magnitude, longitudinally spaced pairs of said plurality of projections being separated a distance that is at least twice the predetermined magnitude.

2. The utensil according to claim 1, wherein the paddle of one of the pair of tongs and the paddle of the other one of the tongs are operable to move from a diverging orientation toward a parallel orientation with a predetermined separation, said predetermined separation being between 1.5 to 4 cm.

3. The utensil according to claim 2, wherein said predetermined separation is between 2 to 3 cm.

4. The utensil according to claim 1, wherein said plurality of projections have a height of at most 3 mm.

5. The utensil according to claim 1, wherein said paddle comprises an electrically non-conductive material.

6. The utensil according to claim 5, wherein the electrically non-conductive material is heat resistant.

7. The utensil according to claim 1 wherein the tapered distal edge is transverse in order to allow said utensil to stand upright and free on a horizontal surface with said tapered distal edge of each of said pair of tongs resting on the horizontal surface.

8. The utensil according to claim 1 wherein said plurality of projections each have a base occupying a predetermined area, the predetermined area occupied by all of the plurality of projections together being less than the unoccupied territory between them.

9. The utensil according to claim 1, wherein the base of each of the plurality of projections has a round perimeter, each of the plurality of projections having a single peak.

10. The utensil according to claim 9, wherein each of the plurality of projections comprises a surface that is a conical section.

11. The utensil according to claim 1, wherein each of the plurality of projections comprise a surface that is a pyramidical section.

12. The utensil according to claim 1, wherein the plurality of projections are arranged in a plurality of transverse rows that are longitudinally spaced at least 1 cm.

13. The utensil according to claim 1, wherein said paddle has a lateral pair of diverging edges.

14. The utensil according to claim 1, wherein said interconnected proximal ends of said pair of tongs comprise a curved flexible arch integrally connected between said pair of tongs.

15. The utensil according to claim 14, wherein said pair of tongs comprise a pair of rectangular blades integrally connected to said curved flexible arch, said paddle of each of said pair of tongs integrally connecting to a different corresponding one of said rectangular blades, said paddle having a trapezoidal outline.

16. The utensil according to claim 1 wherein the predetermined area occupied by all of the plurality of projections together is less than half the unoccupied territory between them.

17. A utensil for removing a food product from the slot of an appliance, the utensil comprising:
an opposing pair of longitudinally disposed tongs having interconnected proximal ends, each of said tongs having a distal paddle that is wider than said interconnected proximal ends, said distal paddle having an outside face, an inside face, and a tapered distal edge that is sloped to increase clearance at said inside face, said distal paddle having on said inside face a spaced plurality of projections, the inside face of the distal paddle having unoccupied territory, the unoccupied territory being portions of the inside face of the distal paddle unoccupied by, and located between, any of the plurality of projections, predetermined ones of said plurality of projections that are adjacent to said distal edge having a distal flank that is sloped to facilitate ingressive passage across said predetermined ones, said tongs being operable to grip said food product by being manually pressed together, said plurality of projections each having a base occupying a predetermined area, the predetermined area occupied by all of the plurality of projections together being less than the unoccupied territory between them.

18. The utensil according to claim 17, wherein the base of each of the plurality of projections has a round perimeter, each of the plurality of projections having a single peak.

19. The utensil according to claim 18, wherein each of the plurality of projections comprises a surface that is a conical section.

20. The utensil according to claim 17, wherein each of the plurality of projections comprise a surface that is a pyramidical section.

21. The utensil according to claim 17, wherein the plurality of projections are arranged in a plurality of transverse rows that are longitudinally spaced at least 1 cm.

22. The utensil according to claim 17, wherein said paddle has a lateral pair of diverging edges.

23. The utensil according to claim 17, wherein said interconnected proximal ends of said pair of tongs comprise a curved flexible arch integrally connected between said pair of tongs.

24. The utensil according to claim 23, wherein said pair of tongs comprise a pair of rectangular blades integrally connected to said curved flexible arch, said paddle of each of said pair of tongs integrally connecting to a different corresponding one of said rectangular blades, said paddle having a trapezoidal outline.

25. The utensil according to claim 17 wherein the predetermined area occupied by all of the plurality of projections together is less than half the unoccupied territory between them.

26. The utensil according to claim 17, wherein the paddle of one of the pair of tongs and the paddle of the other one of the tongs are operable to move from a diverging orientation toward a parallel orientation with a predetermined separation, said predetermined separation being between 1.5 to 4 cm.

27. The utensil according to claim 26, wherein said predetermined separation is between 2 to 3 cm.

28. The utensil according to claim 17, wherein said plurality of projections each have a base with an overall width that is less than a predetermined magnitude, longitudinally spaced pairs of said plurality of projections being separated a distance that is at least twice the predetermined magnitude.

29. The utensil according to claim 17, wherein said plurality of projections have a height of at most 3 mm.

30. The utensil according to claim 17, wherein said paddle comprises an electrically non-conductive material.

31. The utensil according to claim 30, wherein the electrically non-conductive material is heat resistant.

32. The utensil according to claim 17 wherein the tapered distal edge is transverse in order to allow said utensil to stand upright and free on a horizontal surface with said tapered distal edge of each of said pair of tongs resting on the horizontal surface.

33. A utensil for removing toast from the slot of a toaster, the utensil comprising:

an opposing pair of longitudinally disposed tongs having interconnected proximal ends, each of said tongs having a distal paddle that is wider than said interconnected proximal ends, said distal paddle having an outside face, an inside face, and a tapered distal edge that is sloped to increase clearance at said inside face, said distal paddle having on said inside face a spaced plurality of projections, predetermined ones of said plurality of projections that are adjacent to said distal edge having a distal flank that is sloped to facilitate ingressive passage across said predetermined ones, said tongs being operable to grip said toast by being manually pressed together, said plurality of projections each having a base occupying a predetermined area, the inside face of the distal paddle having unoccupied territory, the unoccupied territory being portions of the inside face of the distal paddle unoccupied by, and located between, any of the plurality of projections, the predetermined area occupied by all of the plurality of projections being less than half the unoccupied territory between them, the base of each of the plurality of projections having a round perimeter, each of the plurality of projections having a single peak, each of the plurality of projections comprising a surface that is a conical section, the plurality of projections being arranged in a plurality of transverse rows that are longitudinally spaced at least 1.0 cm, said plurality of projections having a height of at most 3 mm, said paddle having a lateral pair of diverging edges, said interconnected proximal ends of said pair of tongs comprising a curved flexible arch integrally connected between said pair of tongs, said pair of tongs comprising a pair of rectangular blades integrally connected to said curved flexible arch, said paddle of each of said pair of tongs integrally connecting to a different corresponding one of said rectangular blades, said paddle having a trapezoidal outline, said paddle comprising an electrically non-conductive, heat-resistant material.

* * * * *